US008289140B2

(12) United States Patent
Tabe

(10) Patent No.: US 8,289,140 B2
(45) Date of Patent: Oct. 16, 2012

(54) ADVANCED VOICE OVER SAFETY APPARATUS

(76) Inventor: Joseph Akwo Tabe, Silver Spring, MD (US)

( * ) Notice: Subject to any disclaimer, the term of this patent is extended or adjusted under 35 U.S.C. 154(b) by 271 days.

(21) Appl. No.: 11/716,085

(22) Filed: Mar. 9, 2007

(65) Prior Publication Data

US 2007/0229239 A1 Oct. 4, 2007

Related U.S. Application Data

(60) Provisional application No. 60/780,113, filed on Mar. 9, 2006.

(51) Int. Cl.
*G08B 3/00* (2006.01)

(52) U.S. Cl. .................................. 340/384.1; 340/463

(58) Field of Classification Search ............... 340/384.1, 340/463, 435

See application file for complete search history.

(56) References Cited

U.S. PATENT DOCUMENTS

| 2002/0180595 | A1* | 12/2002 | Flick | 340/435 |
| 2005/0121980 | A1* | 6/2005 | Bruwer | 307/87 |
| 2005/0275519 | A1* | 12/2005 | Ferrone et al. | 340/463 |

* cited by examiner

*Primary Examiner* — Shirley Lu
(74) *Attorney, Agent, or Firm* — Joseph Tabe

(57) ABSTRACT

Advanced voice over safety apparatus for vehicles and equipment that operate in a reverse mode using Electro-mechanical or mechanical transmission means. The apparatus is configured for cars, buses, trucks, planes or any other vehicle that moves and uses batteries as part of its power supply. Disclosed embodiment comprises at least one of: a backing safety system, a school bus stop sign arm safety system, vehicle components pre-operation safety system, and a driver information safety system programmed to recognize dangerous vehicle situations and alert the operator of a vehicle in an audible manner the operating conditions to prevent accidents from occurring. The voice over safety apparatus further includes driver inspection program for use before the vehicle is put in operation or put in motion. The apparatus is programmed to sound when the vehicle is backing or unloading occupants, or any other potentially dangerous activity in which a passerby to the vicinity of the vehicle or the operator of the vehicle may become subjected to injuries.

20 Claims, 14 Drawing Sheets

ADVANCED VOICE OVER SAFETY APPARATUS

This application claims priority from a Provisional Application with Ser. No. 60/780,113 filed Mar. 9, 2006.

FIELD OF THE INVENTION

Disclosed embodiment relates generally to warning devices, and more specifically, to apparatus operable to provide human voice over safety signals. Certain embodiments provide human voice auditory comprising simulated voice warning signals serving to protect workers and others within the vicinity of moving vehicles and the like. The voice over safety apparatus is compact, easily mountable within existing vehicles, and provides multiple settings for voice auditory warnings configured to address various commonly encountered situations. Some embodiments provide human voice over safety apparatus operable for communicating to the operator of the vehicle and passer-bys, the actual predetermined mechanical operation of the vehicle which co-exist a prescribed condition of the vehicle or component of the vehicle that may require safety observation to prevent any further accident.

BACKGROUND OF THE INVENTION

The work environment has become laden with unsafe practices, many of which are reasonably necessary to accomplish certain tasks. Although safety in the work environment has become increasingly important, prior devices have failed to bring a common understanding of actual vehicle operations and new attempts to prevent traffic and workplace accidents need to be implemented. The Occupational Safety and Health Administration are responsible for instituting a number of remedial measures to ensure a safe work atmosphere. However, there are many risks associated with the workplace and traffic environment which impact non-workers, including commercial vehicle environment and operations which impacts environmental safety.

Operations involving cars, trucks, airplanes, school buses and other heavy equipment operations remain especially susceptible to unanticipated safety breaches because of unclear signal communications. In many instances, a heavy vehicle operator is not aware of another person's presence near the heavy vehicle; quite simply, the physical size of the heavy vehicle impedes the operator's full view of the immediate surroundings, occasionally resulting to fatal accidents. In other instances, commercial vehicle operators are not fully aware of the unsafe parking conditions of these surroundings, including parked vehicles which may specifically subject the vehicle operators to prescribed unanticipated safety breaches.

Though vehicles are disposed with mirrors to spot objects within vicinity of operations, these high mounted rear view mirrors only give a partial view of what is directly behind a large vehicle, and only for a few feet. Often, a school bus driver is unable to ascertain whether all children have cleared the school bus' vicinity. While various combinations of lights and physical barriers have been introduced and instituted to meet conventional signal communication demands and to provide the proper safety needed, these devices require (a) fair amount of time to be effectively activated and often result in unanticipated safety complications. Motorists and pedestrians alike simply do not react to the breadth of measures instituted to prevent accidents. Clearly, there exists a need for human voice over safety, a vehicular safety device which prevents common injuries associated with moving vehicles, while at the same time, do not create any further unsafe conditions.

Specifically, these needs may co-exist with other audio safety and communication systems that also communicate to the vehicle operator and passerby, the prescribed mechanical operation of the vehicle, such that when the vehicle is exposed to unsafe parking condition, the communication system communicates to the operator the specific condition. As an example, when the vehicle is parked and at least a window is half open, the communication system will communicate to the operator of the vehicle through at least one of the key pad, the cell phone, and/or at least an external broadcasting or communicating device.

Heretofore, loud-able audio devices have been employed to warn of moving vehicles. The sounds normally heard when some trucks move in reverse provides an attempt to warn nearby individuals of a hazardous situation. However, such sounds are not readily recognizable in areas of heavy traffic. Moreover, the resultant behavior of passerby/pedestrians cannot be forcibly controlled. A simple "chirp" sound might cause one to give attention, but does not cause one to respond timely and also does not communicate any discernible message. Furthermore, despite the implementations of various loud-able safety devices, preventable accidents continue to occur with fatal results.

Specifically, many safety breaches are normally associated with vehicles braking or moving in a reverse direction. Owners of school bus and heavy truck fleets recount incidents in which their vehicles have impacted people who were not visible to the vehicles' operators.

Traditional audible signals, alone or in combination with flashing lights and physical barriers, are not completely effective in creating a zone of safety around or between vehicles and pedestrians. Also the vast amount of noise and commotion associated with loading docks prevents drivers from being able to accurately discern the proximity and number of individuals or objects near the vehicle. Accordingly, the need arises for a human voice over safety apparatus for use with various types of vehicles. Disclosed embodiments provide a safety apparatus comprising advanced human voice over safety which is easily installed and which introduces clear and actual operation of the vehicle, and is educational to children, drivers, and the general public. The human voice over safety apparatus is configured to provide instantaneous information and communications specific to the actual situations corresponding particularly to a zone of operation where danger may be eminent. Moreover, the advanced human voice over safety is an audio safety device configured for distributing various safety messages, so that any appropriate message can be repeated in connection with the current normally encountered situations. Disclosed embodiments further provide a safety apparatus comprising advanced human voice over safety apparatus configured for addressing (a) variety of safety concerns, including addressing a collection of components of the vehicle tailored for situation specific to accident prevention. There is plurality of prior art devices directed to address large vehicle safety problems. The various patents described below are but illustrative of the developments commonly found in the field of the present invention.

U.S. Pat. No. 3,504,336 issued to Oliver W. Boblitz on Mar. 31, 1970, describes a safety seat belt warning system comprising a reel device for retracting a section of a seat belt when the belt is not fastened about an occupant of a motor vehicle. Pressure-sensitive electrical seat switches in the motor vehicle's seats are activated by the presence of a passenger.

If a passenger does not fasten a safety belt, a light or buzzer alert is enabled. The result is not capable of warning a driver, passengers, and pedestrians of vehicular movement or lack thereof. Thus, the Boblitz device cannot provide an early warning signal for enabling prevention of vehicle-pedestrian collisions, as provided disclosed embodiments. Further, Boblitz's device is incapable of delivering a plurality of messages to drivers, passengers, and others outside of the motor vehicle. Moreover, voice-chip technology is not contemplated in the prior art disclosure.

U.S. Pat. No. 4,470,036 issued to John F. Doerr on Sep. 4, 1984, describes a safety light warning system for vehicles comprising three color coded lights to indicate driver foot position with respect to the brake and gas pedals. There is no provision for audio warning signals. Accordingly, the Doerr disclosure cannot be used in conditions involving low visibility, as no provision is made for communicating warning messages, but rather for sustained illumination and flashing lights. Moreover, Doerr's device does not provide driver interface wherewith messages can be selectively broadcast passerby the condition of the actual operation of the vehicle.

U.S. Pat. No. 4,839,749 issued to Eustace B. Franklin, on May 19, 1987, describes an audio reminder system for drivers comprising an electronics system that automatically activates a tape recorder programmed to provide an audible speech message of a specific vehicle fault or a time-dependent personal message. Franklin's device specifically provide a siren detector circuit, a speed indicator circuit and a timed personal message circuit.

Unlike the present invention, no means is provided for communicating messages to those outside of a vehicle. Further, Franklin's device does not even contemplate the need to communicate with people/pedestrians outside of a vehicle. In all, Franklin's device warns of vehicular irregularities and faults; but it does not provide any means of broadcasting audible signals in response to the aggravated braking and/or irregular backing movement inherent in the operation of heavy trucks and buses. Franklin's device is of a remedial nature, whereas the present invention is characteristically prophylactic.

U.S. Pat. No. 4,916,372 issued to James Reavell et al. on Apr. 10, 1990, describes a school bus safety device wherein a stop sign or a crossing arm swings out upon the opening of the bus door. While Reveall's device does communicate with vehicles adjacent to a school bus, it does not provide human voice audible signals or warnings of any kind. Further, it is incapable of displaying alternating or actual situation specific messages, unlike the present invention.

U.S. Pat. No. 5,199,754, issued to Lowell J. D. Freeman on Apr. 6, 1993, describes a safety bar comprising a motor driven barrier for installation on the front end of a school bus. The result is not capable of adequately warning a driver, passengers, and pedestrians of vehicular movement or lack thereof. Freeman's device merely deters pedestrians from walking directly in front of the bus.

U.S. Pat. No. 5,210,521, issued to Gary M. Hojell on May 11, 1993, describes a safety warning system for vehicles comprising a Doppler radar system to detect nearby persons.

When a person is detected close to the bus, the bus driver is warned, thereby increasing the possibility of avoiding an accident. There is no provision for communicating audio warning signals to individuals outside the school bus. Furthermore, Hojell's device is not capable of preventing individuals from wandering precariously close to a bus. The present invention avoids dangerous situations by communicating in human voice auditory, a warning message before an accident-prone situation develops. Moreover, Hojell's device does not provide a driver interface wherewith messages can be selectively broadcast.

U.S. Pat. No. 5,226,686, issued to Glenn A. Triggs on Jul. 13, 1993, relates to a safety gate for school buses, which is mounted on the front bumper of a vehicle. The device is a physical barrier only, and does not attempt to communicate an audible warning.

U.S. Pat. No. 5,357,239, issued to Ronald C. Lamparter on Oct. 18, 1994, describes a safety bar and sign comprising a motor driven barrier for installation on the front end of a school bus, and also, a stop sign deployed simultaneously with the barrier. The result is not capable of audibly warning a driver, passengers, and pedestrians of vehicular movement or lack thereof. Similar to Freeman's device, Lamparter's device merely deters pedestrians from walking directly in front of the bus, but does nothing to warn them that the bus is about to move forward and/or backward. The present invention warns a school bus driver to walk around the bus to ensure that all children have cleared the area before any further bus movement occurs.

U.S. Pat. No. 5,406,250, issued to James Reavell et al. on Apr. 11, 1995, discloses a cold weather stop sign for deployment in conjunction with the opening of a school bus door. Analogous to the prior art discussed above, Reavell's device encourages safe practices in the vicinity of school buses. Unlike the present invention, however, Reavell's device does not communicate an audible message.

U.S. Pat. No. 5,467,071, issued to Don M. Koenig on Nov. 14, 1995, describes a warning kit, which produces a visual safety warning to passengers of a vehicle, and to drivers of nearby vehicles, and audio safety prompting messages that are audible to the passengers. Unlike the present invention, Koenig's device is not capable of allowing a bus driver to emit a message to individuals outside of the bus who are not boarding the bus. Further, Koenig's device is not capable of producing audio messages in response to movement of the vehicle itself, whereas the present invention produces audio messages in response to various input critical variables. The present invention sends messages to the bus driver with reference to the children inside the bus.

U.S. Pat. No. 5,510,763, issued to Norman Deckard et al. on Apr. 23, 1996, is directed to a strobe light on the back of a truck. The light is activated when the truck's transmission is either in reverse or in park, and is contingent upon operation of hazard lights. Unlike the present invention, Deckard's device is not capable of broadcasting an audio message in response the truck's transmission position.

U.S. Pat. No. 5,015,991 issued to William Barr on May 14, 1991, is directed to an alarm system for signaling thereof. The signal is enabled when a vehicles door is open and the selector lever of an automatic transmission is not in its full park position. Barr's device is not capable of broadcasting specifically, the exact prescribed message in response to the predetermined mechanical operation of the vehicle.

U.S. Pat. No. 4,923,852 issued to Jerome Lemelson on Jun. 12, 1990, is directed to a machine operation, which is subject to variations in its operational characteristics requiring adjustments, maintenance or replacement of machine parts. Lemelson device is not, and has no way of educating the operator about a specific predetermined mechanical behavior of the vehicle and did not teach a specific prescribed response to a predetermined mechanical condition of the said vehicle.

European Patent Publication No. 90-100731/14 EP-361, 104-A relates to trim fittings for signaling to the passerby outside of a vehicle, wherein electronic display strips show programmed messages for road users. Unlike the present invention, no means of broadcasting an audio message is disclosed. None of the above noted patents, taken either singly or in any combination, are seen to disclose the specific arrangements or teachings of the concepts disclosed in the present invention.

SUMMARY OF THE INVENTION

Disclosed embodiments provide a safety that informs, protects, and communicates, comprising advanced human voice over safety apparatus. Certain embodiments provide the apparatus comprising a safety device configured for vehicles and equipments that can operate in a reverse motion using Electro-mechanical or mechanical means. Some embodiments provide the advanced human voice over safety configured for cars, buses, trucks, and/or any other vehicle that moves and has a battery as part of its power supply.

The advanced voice over safety apparatus comprises a backing safety system, a school bus stop sign safety system, and a driver alert safety system, a loading safety system, a funneling safety system, a dumping safety system, and a safety system for communicating operational conditions of a vehicle to a passerby and/or the operator of the vehicle. Disclosed embodiments further provide human voice safety apparatus comprising a system of hardware connected to a CPU (central processing unit), consisting of a sound chip in association with at least a waterproof speaker. Certain embodiments provide the advanced voice over safety apparatus being programmed to recognize dangerous vehicle situations and alert the operator of the vehicle in an audible manner, the conditions of the dangerous situation to prevent any further accidents that may have occurred. Some embodiments provide the advanced voice over safety apparatus comprising an inspection program operable before the vehicle is put in operation. Other embodiments provide audible discernable warnings programmed to sound when the vehicle is backing up or unloading objects or pupils or any other potentially dangerous activity in which the passerby to the vehicle may become injured.

DETAILED DESCRIPTION OF THE PREFERRED EMBODIMENT

Figure 4:
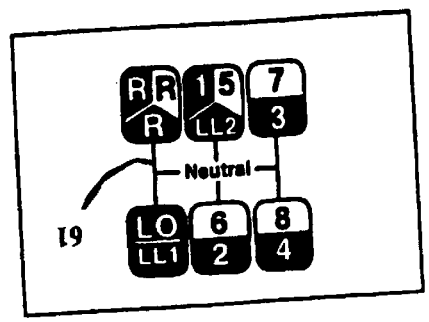
FIG. 4 is seen to represent a transmission means responsive to engage the vehicle in reverse mode.

The terminology used herein is for the purpose of describing particular embodiments only and is not intended to be limiting of embodiments. As used herein, the singular forms "a", "an", "at least", "each", "one of", and "the" are intended to include the plural forms as well, unless the context clearly indicates otherwise.

It would be further understood that the terms "include", "includes" and/or "including", where used in this specification, specify the presence of stated features, integers, steps, operations, elements, and/or components, but do not preclude the presence or addition of one or more other features, integers, steps, operations, elements, components, and/or groups thereof. In describing example embodiments as illustrated in the drawings, specific terminology is employed for the sake of clarity. However, the disclosure of this patent specification is not intended to be limited to the specific terminology so selected and it is to be understood that each specific element includes all technical equivalents that operate and/or function in a similar manner. It would be further noted that some embodiments of the enclosed communication apparatus is used concomitantly and/or not used concomitantly with advanced human voice over safety. In some embodiments, the communication apparatus comprises a platform array responsive to media communications. In some embodiments, the communication apparatus further comprises of a platform array responsive to signal radiation. Other embodiments herein describe apparatus configured for communications with passerby within the vicinity of the vehicle operation.

The foregoing and/or other objects and advantages would appear from the description to follow. Reference is made to the accompanying drawing, which forms a part hereof, and in which is shown by way of illustration specific embodiments in which the embodiments may be practiced. These embodiments being described in sufficient detail to enable those skilled in the art to practice the teachings, and it is to be understood that other embodiments may be utilized and that further structural changes may be made without departing from the scope of the teachings. The detailed description is not to be taken in a limiting capacity, and the scope of the present embodiments is best defined by the appended claims. Referencing the drawings, wherein reference numerals designate identical or corresponding parts throughout the several views, exemplary embodiments of the present patent application are hereafter described. The numbers refer to elements of some embodiments of the disclosure throughout. As used herein, the terms "and/or" and "at least one of" include any and all combinations of one or more of the associated listed items.

Figure 2:
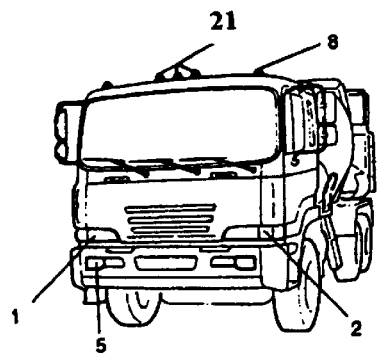
FIG. 2 is seen to represent a cement mixer truck with a speaker means mounted on top of the cab.
Figure 3:
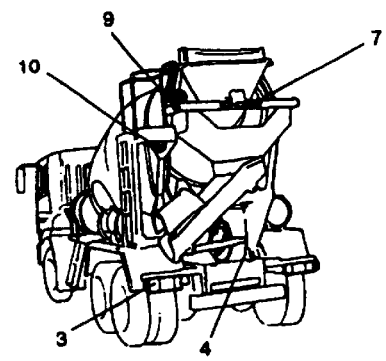
FIG. 3 is seen to represent a mixer truck backing and the sensor means activated.
Figure 1:
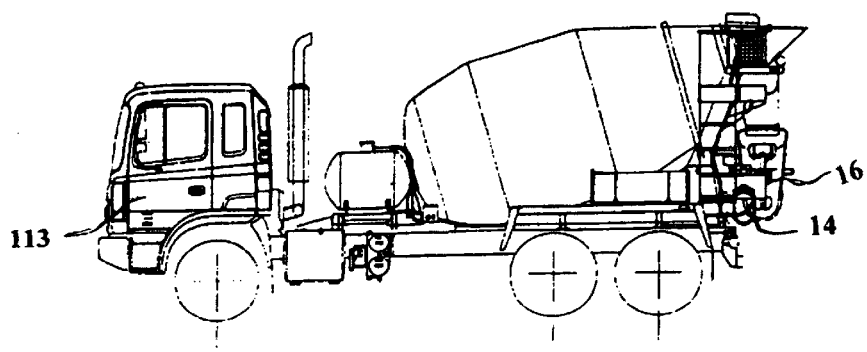
FIG. 1 is seen to represent a cement mixer showing components that would incorporate switch means.
Figure 5:
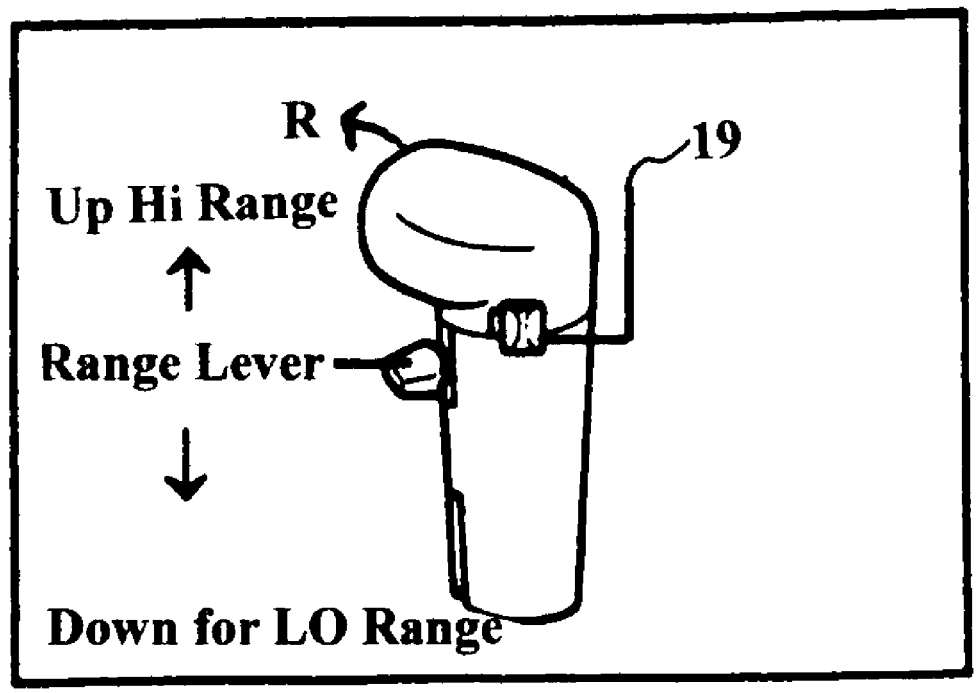
FIG. 5 is seen to represent a transmission means responsive to engage the vehicle in motion.
Figure 7:
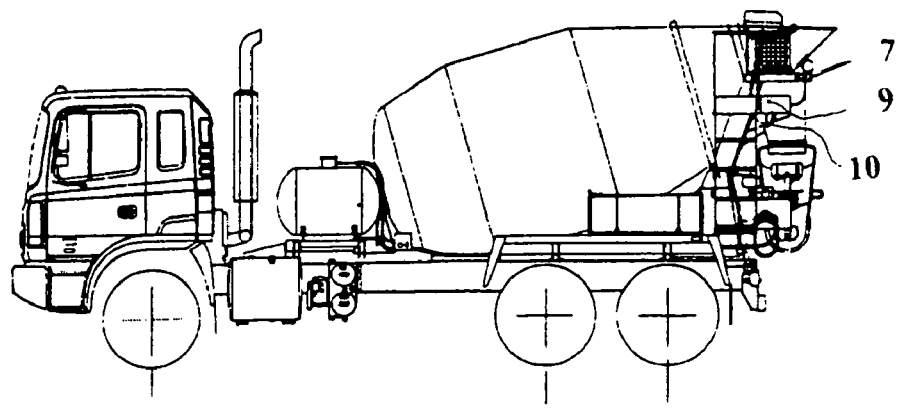
FIG. 7 is seen to represent a mixer truck in motion.
Figure 6:
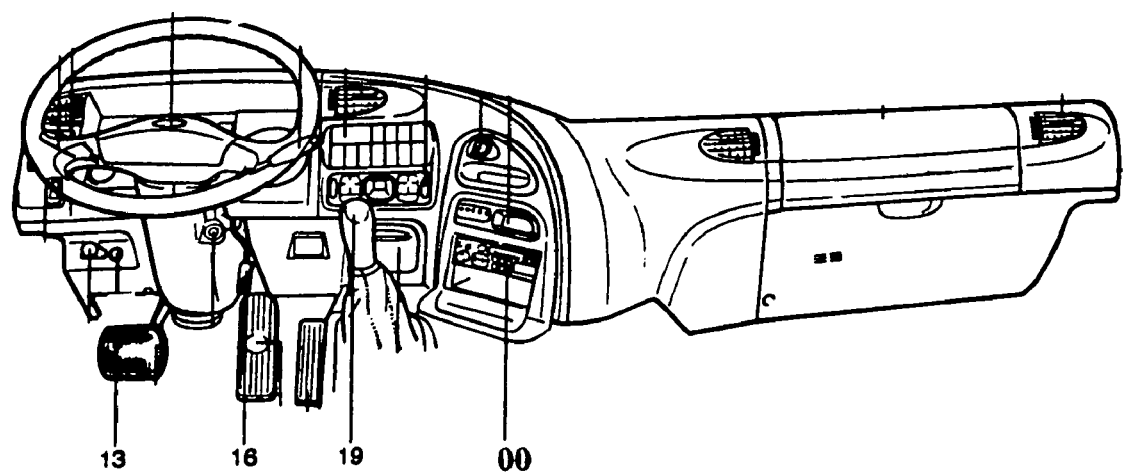
FIG. 6 is seen to represent the interior of a vehicle with the voice over safety apparatus mounted at the dashboard and the transmission means enabled.

Referring to FIG. 1 is seen exemplary embodiment of a cement mixer truck (13) configured with sensors (14), and (16). Disclosed embodiments further provide the cement mixer truck disposed with at least a door 113 in association with the sensors 14 and 16. Referring to FIG. 2 is an exemplary embodiment of the mixer truck comprising a front view configured with at least a speaker means (21) disposed on the cab (16) of the mixer truck. Certain embodiments provide the cab (16) comprises components of the vehicle (8) that are subject-able to pre-operation, such as the door (113). Some embodiments provide the components of the vehicle (8) that are subject-able to pre-operations being configured with switches (1), and (2). Other embodiments of the disclosure provide at least a second sensor (5) configured to monitor objects on the vehicle operator's blind side. Referring to FIG. 3 is seen further exemplary embodiment of a vehicle configured with apparatus for engaging the vehicle in a reverse motion. Disclosed embodiments provide the vehicle comprising a cement truck disposed with sensor (4) configured to monitor the vehicle's proximity to objects. Certain embodiments provide the vehicle being disposed with a hydraulic cylinder (10) configured with switch means operatively connected to emergency lights (3), (7), and (9), which are enabled when the cylinder (10) is in operation. Some embodiments provide the lights (3), (7) and (9) being disposed with sensors in communication with human voice auditory operable to communicate to passerby and/or the operator of the vehicle, the actual operation of the vehicle and/or the vehicle components. Referring to FIG. 4 is seen exemplary embodiment of a transmission means (19) operable for selecting the vehicle's directions and safe operable mode. Disclosed embodiments further provide the transmission means (19) configured to activate a switch means when operated in a reverse mode {circle around (R)}. Certain embodiments provide the transmission means (19) comprising at least a gear selector control configured with various selection modes for providing proper environmental operation. Referring to FIG. 5 is seen further exemplary embodiments of the transmission means comprising down low range, upper high range, forward range, rearward range and a deep reduction button. Referring to FIG. 6 is exemplary embodiment of an interior component of the vehicle. Disclosed embodiments provide the interior of a vehicle comprising at least a transmission means (19) and (13), a braking means (16), and a voice auditory communication apparatus (00). Certain embodiments provide the transmission means further comprising at least a manual gear shifter (19) in association with at least a clutch pedal (13). Some embodiments provide the transmission means (19), and (13) operable in reverse mode to activate a switch means in association with the transmission means. The switch means is configured to provide signal communications for the voice over safety communication apparatus (00). Referring to FIG. 7 is seen further exemplary embodiment of at least emergency lights (7), and (9) that are activated when the switch means is closed. Disclosed embodiments further provide the emergency lights being operable with the operation of cylinder (10). Certain embodiments provide the lights further disposed with speaker means operable for broadcasting safety communications in human voice auditory.

Figure 9:
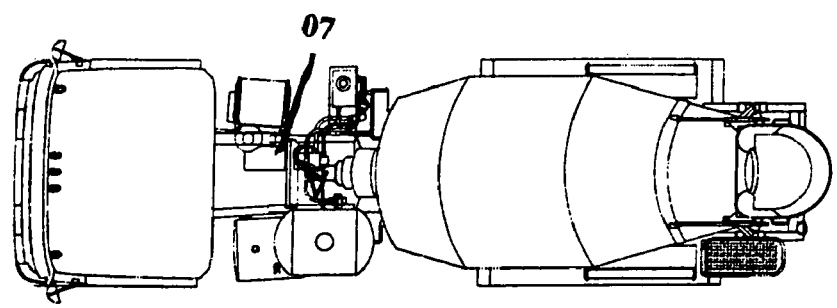
FIG. 9 is seen to represent the top view of a truck showing a battery means.
Figure 8:
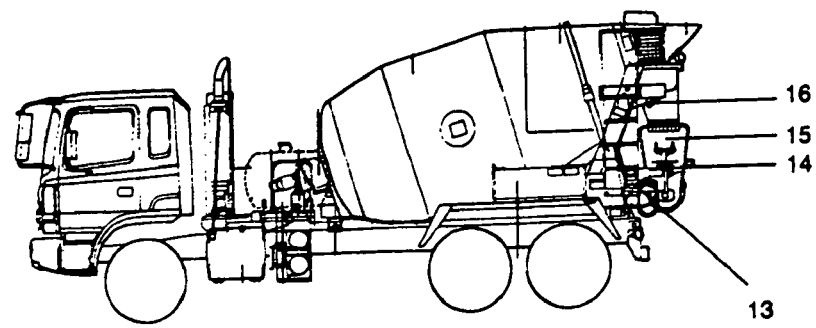
FIG. 8 is seen to represent a cement mixer truck showing a sensor means.

Referring to FIG. 8 is seen an exemplary embodiment of a cement mixer truck disposed with proximity sensor (13). Disclosed embodiments further provide the cement mixer truck disposed with sensors (16), (14), and operatively connected to at least a switch means. The switch means is further configured for activation when at least a cylinder in association with at least a chute (15) is in operation. Disclosed embodiments provide the sensor (14) in communication with at least a transmission means, and sensor (16) communicatively connected to the chute means (15). Certain embodiments provide the transmission means comprising at least a transmission switch in association with at least an electrical power means. Some embodiments further provide the transmission switch in communication with at least a mechanical means. Other embodiments provide the electrical power means in association with the switch means communicatively connected with the chute cylinder to enable the chute's motion for cement funneling. Disclosed embodiments provide human voice over safety apparatus responsive to the operation of the chute switch and/or the closed and/or opened circuit of the transmission switch. Certain embodiments provide the human voice over safety apparatus which is enabled upon the switch means activation. Chute (15) is connected to scoop, which is connected to a hopper assembly. Referring to FIG. 9 is seen an exemplary embodiment of the electrical power means (07). The electrical power means further comprises at least a battery.

Figure 10:
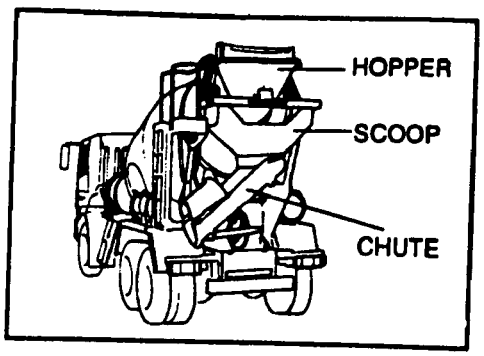
FIG. 10 is seen to represent the rear of a cement mixer truck showing the hopper, scoop, and chute for cement funneling.
Figure 11:
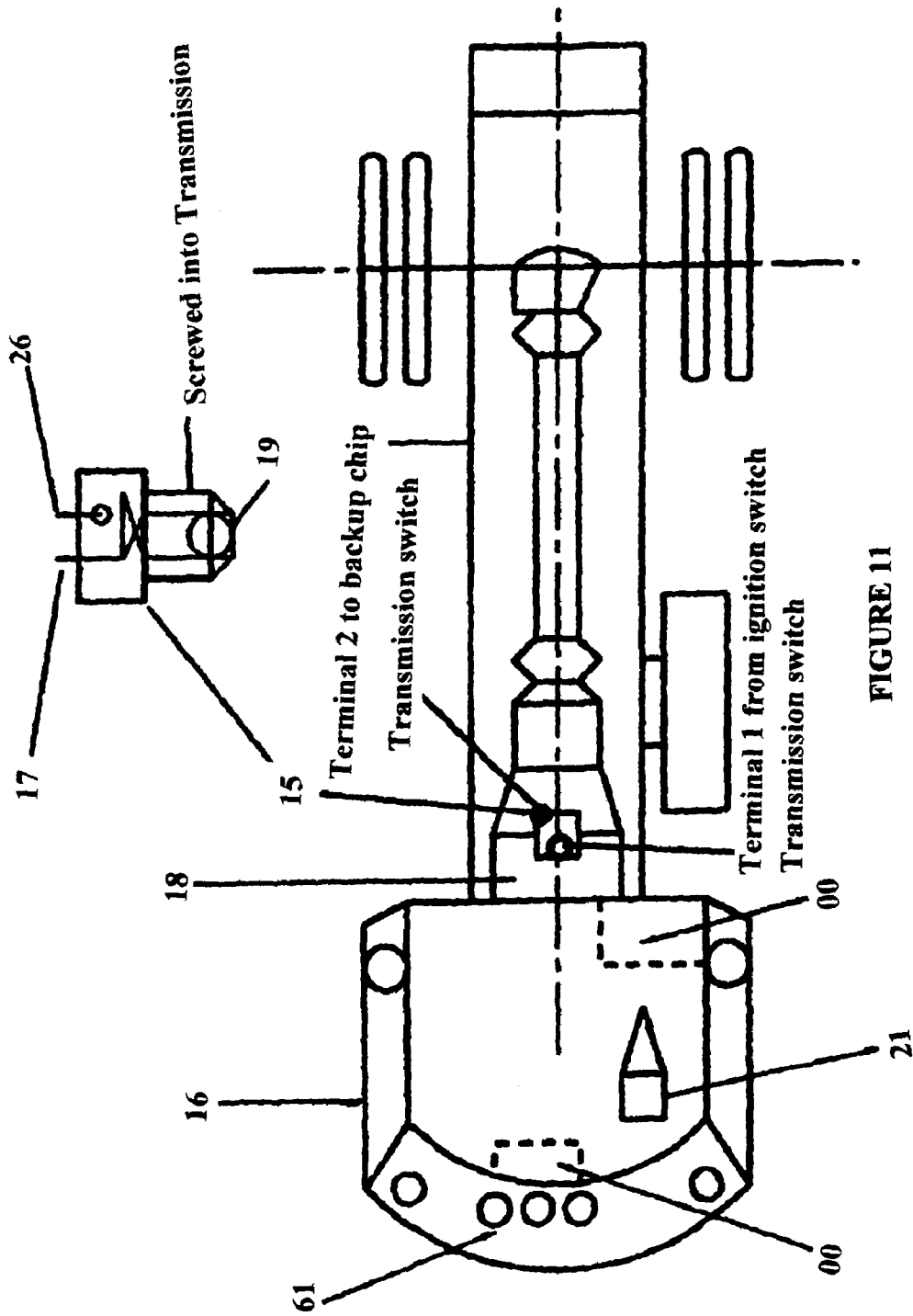
FIG. 11 is seen to represent transportation equipment with the advanced voice over safety apparatus, a bed is shown, and a transmission system is seen to activate a backup switch when engaged in a reverse mode. On top of the cab is seen a waterproof speaker responsive for outputting responses.

Referring to FIG. 10 is seen further exemplary embodiment of the cement truck, comprising at least a hopper, at least a scoop, and at least a chute. Referring to FIG. 11 is seen further exemplary embodiment of a truck. The truck is disposed with at least a transmission (18) operatively configured with a switch (15). The switch is communicatively connected to a voice over safety apparatus (00), which is connected to at least a speaker means (21). The switch means (15) is configured with pressure point (19) operable when the transmission is in reverse mode. Disclosed embodiments provide the transmission switch means (15) configured with at least two terminal. Certain embodiments provide at least an input terminal (17) providing the initial current from the ignition. Certain embodiments provide at least one terminal comprising an output terminal (26) operatively connected to the voice over safety apparatus (00). Some embodiments provide the voice over safety apparatus (00) comprising human voice auditory being recorded on at least a chip. Other embodiments provide the truck being disposed with at least a sensor (16) configured for detections, in communication with the voice over safety apparatus (00). The truck is further disposed with at least a caution light (61) for communication when the transmission is engaged n reverse mode. Disclosed embodiments further provide the caution light disposed with the voice over safety apparatus for broadcasting in human voice auditory, the actual operation of the truck to passerby.

Figure 12:
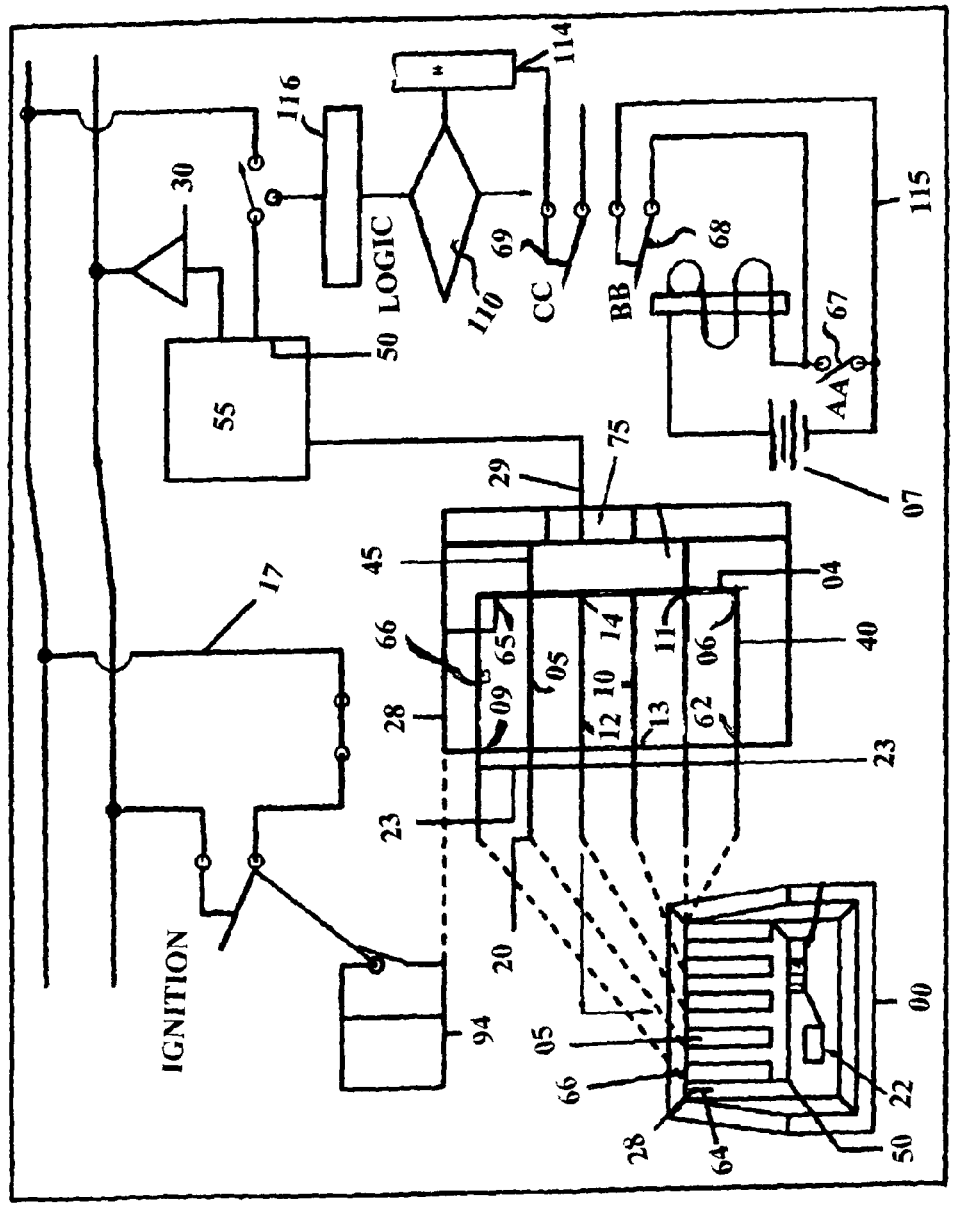
FIG. 12 is seen to represent a circuit diagram configured with the ignition switch, the data processor, the logic interface, and the voice chip.

Referring to FIG. 12 is seen an exemplary embodiment of multiple configuration for the voice over safety apparatus. Disclosed embodiments provide voice over safety comprising voice auditory (05) in association with at least a conventional stop sign arm. In the disclosure, the stop sign arm 14 is fully extended for visually reminding drivers to lawfully stop when a school bus is unloading or loading students and the human voice auditory is broadcasted to inform drivers abound about the operation of the school bus. At least a voice auditory (62) is responsive to the brakes or when the vehicle stops to unload students. Disclosed embodiments further provide the human voice auditory signal (05) and (62) in connection with the siren auditory signal. Certain embodiments provide the human voice auditory apparatus comprising a warning mechanism configured for human voice communication prior to the siren/alarm function. Some embodiments provide the stop sign arm in extended mode, enabling the human voice auditory signal (05) to intone the following message: "Please stop at 25 feet; this vehicle is coming to a complete stop." By incorporating the siren auditory signal and the human voice auditory signal, disclosed embodiments provide advanced safety apparatus to keep vehicles at a safe distance from children near the school bus. It is anticipated that the "25 feet" wording of the voice recording is modifiable in accordance with the requirements of the local laws of various regions in which disclosed embodiment is utilized. Disclosed embodiments further provide a third driver safety system comprising advanced voice auditory safety system configured for driver/operator of a heavy-duty truck, school bus, or any transportation equipment. Embodiments provide human voice auditory (09) operable to exhibit with established safety principles for operating commercial and heavy duty vehicles.

Disclosed embodiments provide a circuit path to emit the human voice warning. In the disclosure, when a heavy-duty truck or school bus has stopped and the parking brake is applied, at least a sensor (65) is provided to relay a "1" signal to the braking chip (66), to acknowledge that the vehicle is parked and stopped. The braking chip (66) contains three logical sequence of operations. The first sequence AA, comprises sensor (67) that monitors the parked condition until the brake is attempted to be released. When signal is released from the transmission switch, terminal (28) is activated responsive to the transmission being engaged in a reverse mode. Certain embodiments provide sensors 28, 65, 66, and 67 in communication with data processor (23) operable for processing signal communication to the prescribed human voice auditory.

Some embodiments provide sequence AA configured with sensor (67) to release a "0" signal when the parking brake is released to disable itself. Disclosed embodiments further provide sequence BB comprising logic module (68). Sequence BB is in association with the logic module (68) responsive to current pulse to amplify the sound chip to emit the human voice warning. An example of a warning signal that may be emitted is "Walk around to ensure that the surroundings are clear of children, pedestrians, or obstacles before proceeding." The voice signals will continue to sound until the driver again tries to release the parking brake, or for 30-35 seconds, whichever lapses sooner. Certain embodiments provide sequence CC comprising software (69). Some embodiments provide sequence CC in association with software (69) for communication with CPU (22). Other embodiments provide the CPU in communications with data processor (23) to initiate a standby mode until further warning is enabled.

Embodiment further provide hydraulic lift voice signal (10), dumping equipment voice signal (11), tailgate mechanism voice signal (12), and hydraulic cylinder safety voice signal (14), further comprising hydraulic systems for front-end loader vehicles. Embodiments provide voice over safety apparatus operable to remind/provide safety to at least one of: a driver, a technician, a mechanic, and a passerby. In the disclosure, the mechanic would be informed to manually lock a cylinder before attempting to work around the opened or lifted area of a bed or tailgate, or within cylinder operated devices. Disclosed embodiment is configured to eliminate possible mechanical failure types of accidents. When the tailgate mechanism is opened or the body of the truck lifted up, logic sequence BB will ensure safety. Embodiment provide an on/off switch (94) mounted on the cylinder-housing. At least a switch button (64) is configured with hydraulic control chip (110) for safety communications.

Embodiments further provide audio voice over safety apparatus (00) configured to respond to different types of vehicle operations. The ignition switch (17) is connected to a logic switch (115). The logic switch 115 is operatively connected to voice over safety apparatus (00). A memory (45) is operatively configured with the voice over safety apparatus (00) and communicatively connected to the logic switch (115) responsive to a vehicle pre-operation and/or pre-mechanical operation, including a transmission means.

Certain embodiments provide a voice over safety apparatus comprising a backing safety system (04); school bus stop sign arm safety configured with voice over safety system (05), and driver alert voice over safety system (06).

Some embodiments provide the voice over safety apparatus that relays to pedestrians the specific operation of the vehicle and to the driver the specific pre-operation of the vehicle's components and vehicle's proximity to objects at the rear or side of the vehicle. A proximity sensor and/or an infrared sensor are configured with the voice over safety apparatus to relay to the operator of the vehicle the vehicle's proximity to an object. The communication is enabled when the transmission means is engaged in a reverse mode (R). Disclosed embodiments provide voice over safety apparatus configured to advance the safeties surrounding vehicle's mechanical and electromechanical operations such as transportation vehicle (09), hydraulic lift equipment (10), dumping equipment (11), tailgate mechanism (12), cement mixing and funneling equipment, cars (13) and hydraulic cylinder operated devices (14).

Certain embodiments provide voice auditory safety apparatus comprising education apparatus for operators of (09), (10), (11), (12), (13), (14) vehicles and cars, providing a step-by-step checks to inspect the vehicles before any mechanical operation occurs. In this manner, the operators of the vehicles may detect trouble before it arises in the routine operation of the vehicles, which may create a much more hazardous situation. The voice over safety apparatus (00) is for use on cars and buses, trucks, and all transportation moving vehicles that use batteries (07), and which engages in reverse motion by either Electro-mechanical transmission or mechanical transmission. Some embodiments provide voice over safety apparatus (00) comprising at least a hardware configured with a logical interface means (20) for enabling communications. The hardware, is mounted in the rear or in the cab of any of (09), (10), (11), (12), (13), (14) vehicles operatively configured for outputting signals to at least a waterproof exterior speaker comprising an output (29).

The interface means (20) comprises an interface module communicatively connected to CPU (22) or controller responsive to signal communication with processor (23). The interface module (20) receives data and coded instructions from the processor (23), for enabling prescribed output signals to be broadcast through the speaker. The hardware identifies the vehicle's physical components by using logical sequences enabled by the logic switch (115), further operable to transmit coded data from the processor (23) in association with CPU (22) (Central Processing Unit).

Disclosed embodiments further provide voice over safety apparatus (00) comprising memory (116) configured with the logic switch (115) responsive to the software (114). The software (114) coordinate responses for data processor (23), initiating the appropriate response to be broadcasted. The CPU (22) uses the processed sequences to transmit and emit a particular human voice warning phrases as a response, depending on the pending safety hazard environment. The voice auditory apparatus further comprises a chip (55) embedded in the CPU (22) and connected to a delay output (75) operable for initiating a delay per broadcasted phrase. The voice over safety apparatus may be mounted atop a vehicle's cab, or alternatively, elsewhere within the vehicle and attached to an external waterproof speaker.

The logical sequence will start the appropriate data processing for a defined type of vehicle in regards to which messages and warnings are necessary. The warning information is relayed via electronic circuitry in associated with the voice auditory to the waterproof speaker. The voice over safety apparatus further comprises safety data processing that enables reaction to different defined safety areas called fields (40).

The fields are stored in a data format, and each field is defined in the data processor (23). The data processor (23) is interactive with the interface module (20) to enable safety data processing comprising the actual operation of the vehicle. The interface module (20), which is an interface means, may be embedded in the CPU (22). The interface module (20) is configured to receive data and coded instructions from the data processor (23), for enabling prescribed output signals to the water proof speakers for broadcasting to the surrounding. The data processor (23) stores coded data elements as fields (40), e.g. trucks, school buses, buses, planes and their relationship to the particular type of field as records, i.e. components of the fields in its memory (45).

The data processor (23) further allows data abstraction from its memory (45) when a coded signal or electrical pulse is received from one of its records. The records are the defined mechanical components that are liable to mechanical failure, or components that need safety attention. Disclosed embodiments provide voice over safety apparatus comprising amplifying device (30). The field records of the data processor (23), when tempered send signals or electrical pulses to determine and match the appropriate voice auditory signal to be enabled through the speaker to the surroundings. Data processing is controlled by the CPU (22), which filters signals through the processor defined functions as part of the logical sequences, and relay to the voice auditory chip (55), in association with the amplifier (30) to output voice communications to the speakers for broadcasting. These processor-defined functions are enabled by signals or electrical pulses referencing the appropriate safety perimeters for a particular vehicle or field. Vehicles are designed to carry different tasks and perform different functions.

The electrical pulses provided through the circuitry provide signals responsive to different mechanical operations of the records. When a field (40), like a cement mixing truck, is equipped with the voice over safety audio safety device, its defined perimeter would be limited to the functional operation of its records; such operations are energized by the electrical pulses and differentiated by its records. Each safety breach is assigned a field to the data processor (23). These fields enable output (75) to the voice auditory voice auditory chip (55), thus emitting an appropriate voice auditory warning messages through the speakers. At least a voltage suppressor (50) is provided to protect against voltage spike.

Figure 13:
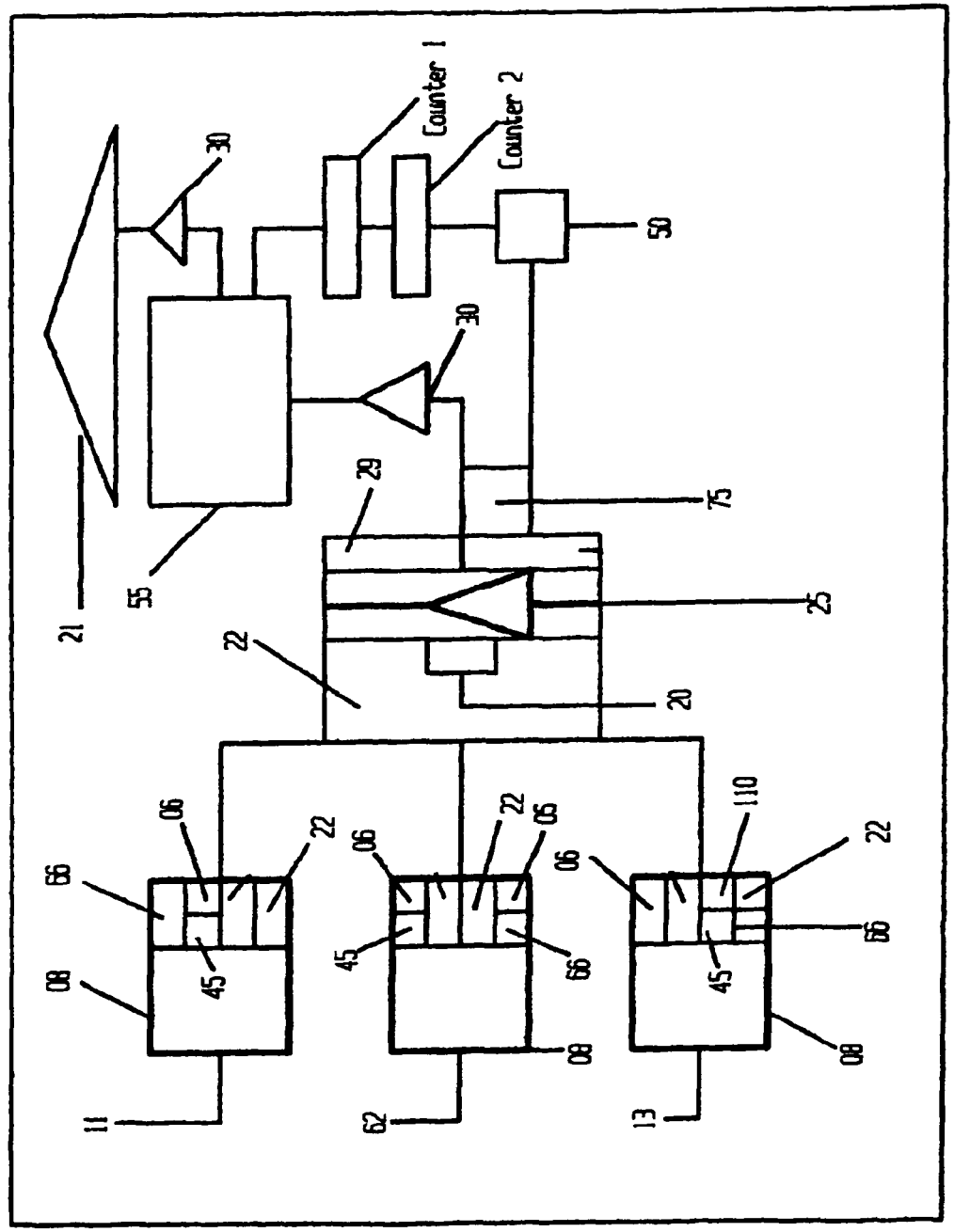
FIG. 13 is seen to represent a block diagram showing sequence of operations of components of the advanced voice over safety apparatus.

Referring to FIG. 13 is seen further exemplary embodiment of the voice over safety apparatus, comprising at least hardware (08). Recognizing that audio alerts are critical accompaniments to certain motor vehicular movement, disclosed embodiments provide a voice over safety apparatus comprising voice auditory responsive to backing system. The voice over safety is configured to prevent injuries when a vehicle moves in a backward direction. Initially, electrical current flows to one end of the switch terminal when the ignition is activated. The voice over safety apparatus is configured with human voice auditory communications comprising at least one of: (05), (06), (11), (13), (66), and (110) in communication with an amplifying device 30. In the disclosure, voice auditory (05) is configured for school bus (62); voice auditory (06) is configured to alert vehicle operators; voice auditory (11) is configured for dumping equipments; voice auditory (13) is configured for cement trucks to communicate funneling safety; voice auditory (66) is configured for backing up; voice auditory (110) is configured for hydraulic equipment operations. Disclosed embodiment further provide voice over safety apparatus configured with at least one of: memories (45); logical interface (20); relays (25); voice chip (55); and at least a delay (75). Certain embodiments provide the voice over safety apparatus configured with at least one of: CPU (22); speakers (21); voltage suppressor (50); and an output means (29). Some embodiments provide the voice over safety apparatus configured with at least a counter responsive to communication intervals. The counter may comprise counter 1 and counter 2 when multiple signals are broadcasted.

Referring to FIG. 8 and FIG. 11 is seen the backup switch (15) located at the vehicle's transmission (18). The switch (15) comprises a circuit which is closed when the vehicle's transmission (18) and/or transmission means (19) is engaged in a backward or reverse mode (R.) The signal to the switch actives the sensor (14), (16), enabling the sensors to monitor the vehicle's proximity to objects behind it.

Referring to FIG. 11 and FIG. 12, disclosed embodiments provide voice over safety apparatus in communication with vehicle's transmission (18), which is engaged in a reverse motion to apply pressure to the transmission end of the switch (15), enabling it to complete its circuit and energize the backup safety system (04) operable for providing a human voice auditory response. The closing of the circuitry is an indication of a complete circuit reaction, and electrical pulses are sent to the data processor to release the particular response prescribed for backing activities. The response is enabled when the transmission (18) is engaged in a reverse mode, allowing current to flow from the backup switch terminal (26) to sequence BB. The processor (23) is further configured for selecting the appropriate response, and would transmit signals to the voice auditory chip (55).

The voice auditory chip (55) will then emit the correct warning prescribed by the processor for broadcasting, emitting warning phrases in human voice with a delay in repetition of at least one second. The circuit path for any of the possible mechanical conditions in which a safety breach may occur is configured for logically I/O signaling. In this instance, "I" indicates a complete and closed circuit and the CPU (22) may be employed in this manner for signal activation. Accordingly, an "O" is an opened circuit and the CPU (22) may not be operable in this manner. The input unit (28), and output unit (29) are in association with the data processor (23), which further controls input and output signals, in communication with memory device (45) configured with a relay (25). The relay (25) receives data through memory functions in association with the CPU (22), which further empowers the signal to the amplifier (30). The amplifier is operatively connected to the voice auditory chip (55). The CPU (22) is required to control the energy source of the switches and activate responses with a minimum of control energy. Disclosed embodiments provide the CPU (22) comprising a computer module wherein coded signals are compared with requisite targets keyed to activate various human voice responses.

Figure 14:
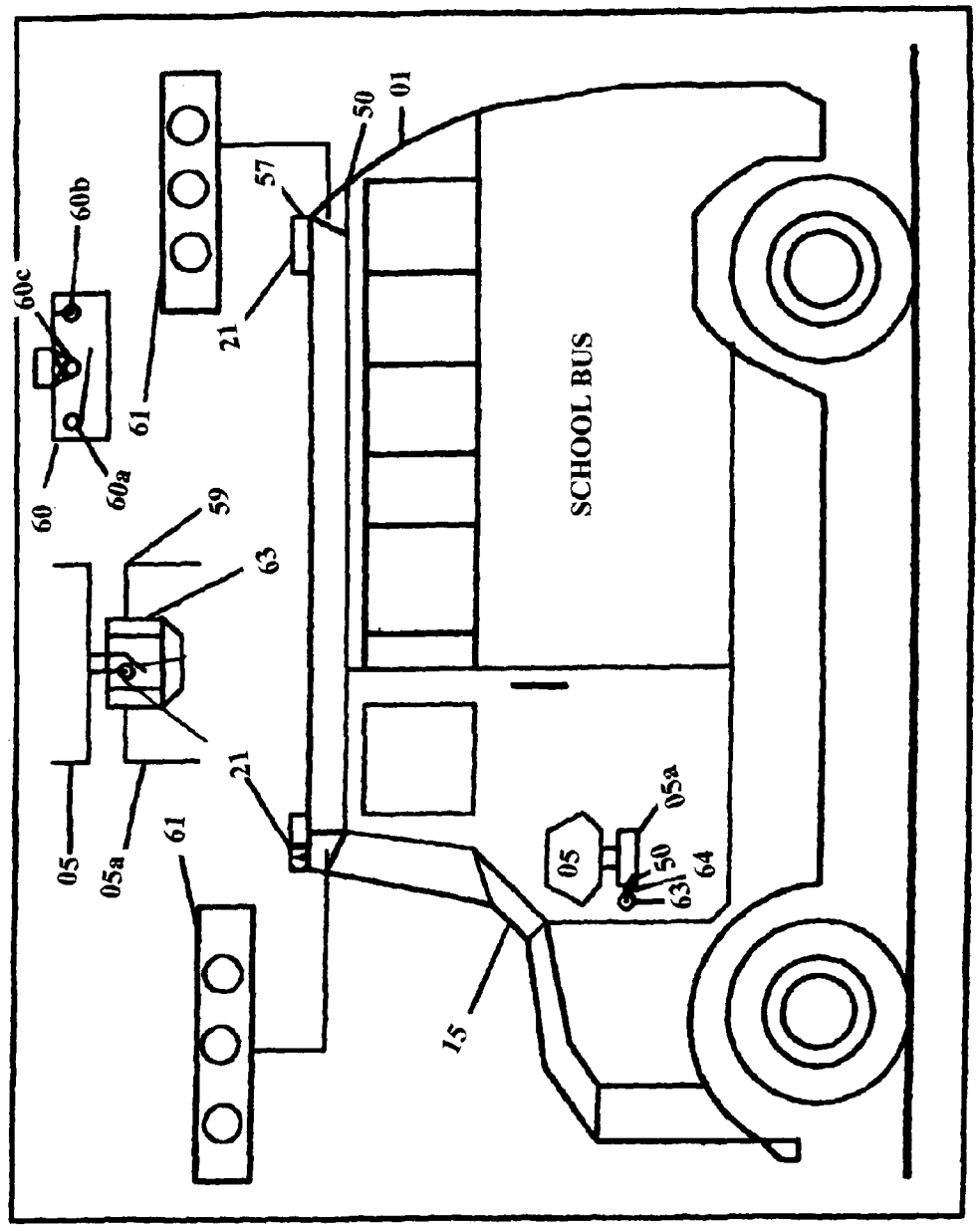
FIG. 14 is seen to represent a school bus with the stop arm safety and sequence of events and switch operation, which occur during the operation of the vehicle.

Referring to FIG. 14 is seen an exemplary embodiment of a school bus (62) disposed with voice over safety apparatus. The school bus is configured with stop sign arm (05) in association with a base plate (05a). When the ignition switch (60) is enabled, current flows through terminal (60a) to terminal (60b) in association with the voice over safety apparatus. For multiple voice auditory output, signal may also flow through terminal (60c). A voltage suppressor (50) comprising transient pike, pikes out excess voltage, thus protecting the voice over safety apparatus. The horn auditory (57) is configured to alert individuals proximate to a vehicle of vehicle movement. Specific activation of the conventional horn auditory signal (57) and/or the human voice auditory signals (55) may be enabled by a switch (63). Disclosed embodiments further provide a push button switch (64) configured with at least a ground terminal (59). A waterproof speaker (21) is configured with the horn auditory signal (57) and the human voice auditory signal (55) to emit communications within a localized area of operation.

The waterproof speaker (21) is preferably mounted at the top of a heavy vehicle's cab, at the tail-light, at the mirrors or mirror brackets, or near a typical mounting of a horn (57). In the alternative, the waterproof speaker (21) is mounted at the rear of a heavy vehicle to emit the horn auditory signal and the human voice auditory signals near a portion of the heavy operation, which usually produces excessive noise. It is contemplated that such a rearward mounting of the waterproof speaker (21) would provide effective emission of the horn auditory signal and the human voice auditory signals (55). Upon activation of the backup switch terminal (15), the human voice auditory voice auditory chip signals (55) would emit the horn auditory signal twice in succession, with a delay of approximately 1/20 of a second, at least at 120 decibels. The delay time is significant because it serves as an alert call to provide communication signal to individuals proximate to the vehicle's rear. At least the signal comprises informative message. At a delay of 1/10 of a second after the horn auditory signal has been emitted, the human voice auditory signals (55) are broadcasted. The delay in timing for the voice auditory signals is significant because traditional safety environments mandate communication of safety messages in less than two seconds to prompt action. Disclosed embodiments further provide voice over safety apparatus configured with at least a camera (01), at least a caution light (61).

Referring to FIG. 13 AND FIG. 14, the human voice auditory signal (55) is configured to convey the message, "Attention! Please stand clear, this refuse truck is backing." It is anticipated that the message would be specific to the unique operation and character of the subject vehicle, such that the words "refuse truck" would be replaced by a unique description of the vehicle within which the voice over safety apparatus has been installed. The message could be repeated successively in Spanish, French, or any other desired language. Disclosed embodiments further provide voice over safety apparatus configured for transit/school bus (62) with "stop sign arm" operable with voice auditory safety system to prevent injuries when unloads students. Certain embodiments provide school bus stop sign arm safety system (05) that creates two optimal situations. First, drivers of nearby vehicles are warned that the school bus (62) is planning to make a sudden stop. This is critical because current methods of alerting drivers to sporadic school bus (62) braking/stopping do not always convey the message quickly enough for drivers to respond in a desired fashion. Secondly, drivers of nearby vehicles are alerted that students will be moving towards and emanating from the school bus (62) after it stops. Some embodiments provide voice over safety apparatus configured to ensure that drivers are aware that sudden darting and straggling students may enter the roadway. To warn nearby vehicles that the school bus (62) is braking, embodiment employs an audible siren signal, accessed from the human voice auditory signal (55), which is played for at least 1/10 of a second, and broadcasted through the speaker (21), that may be mounted atop the cab or within the vicinity of the vehicle operation. In one embodiment, the audible siren signal is activated when conventional yellow caution lights (61) flashes from the school bus (62). A push in switch (63) is located at the base of the stop sign arm for activating the caution light and the voice auditory for the stop sign arm.

When the stop sign arm (05) is completely extended, the ground terminal (59) of the push in switch (63) will be grounded, completing the circuit and allowing current pulse to flow to the output terminal of the switch. The data processor (23) is configured to relay the appropriate voice-auditory voice auditory. The voice auditory is amplified by the amplifier device (30) to passerby. In the alternative, a three terminal push in switch is employed, wherein current flows to one terminal at all times when the stop arm (05) is idle. The three terminal switches (60) allows constant current on one terminal (60a), a ground on the second terminal (60b) that receive its grounding when the base plate (05a) begins to move. The third terminal (60c) relays signals from the base plate to the data processor (23) to enable a prescribed response.

When the stop sign arm (05) begins to motion outwardly, (a) the base plate (05a) pushes in on the switch button (64), enabling the ground terminal (60b) to be grounded for initiating a closed circuit. The supplied current will then relay activation to the siren to alert drivers that the vehicle intends to stop.

Figure 15:
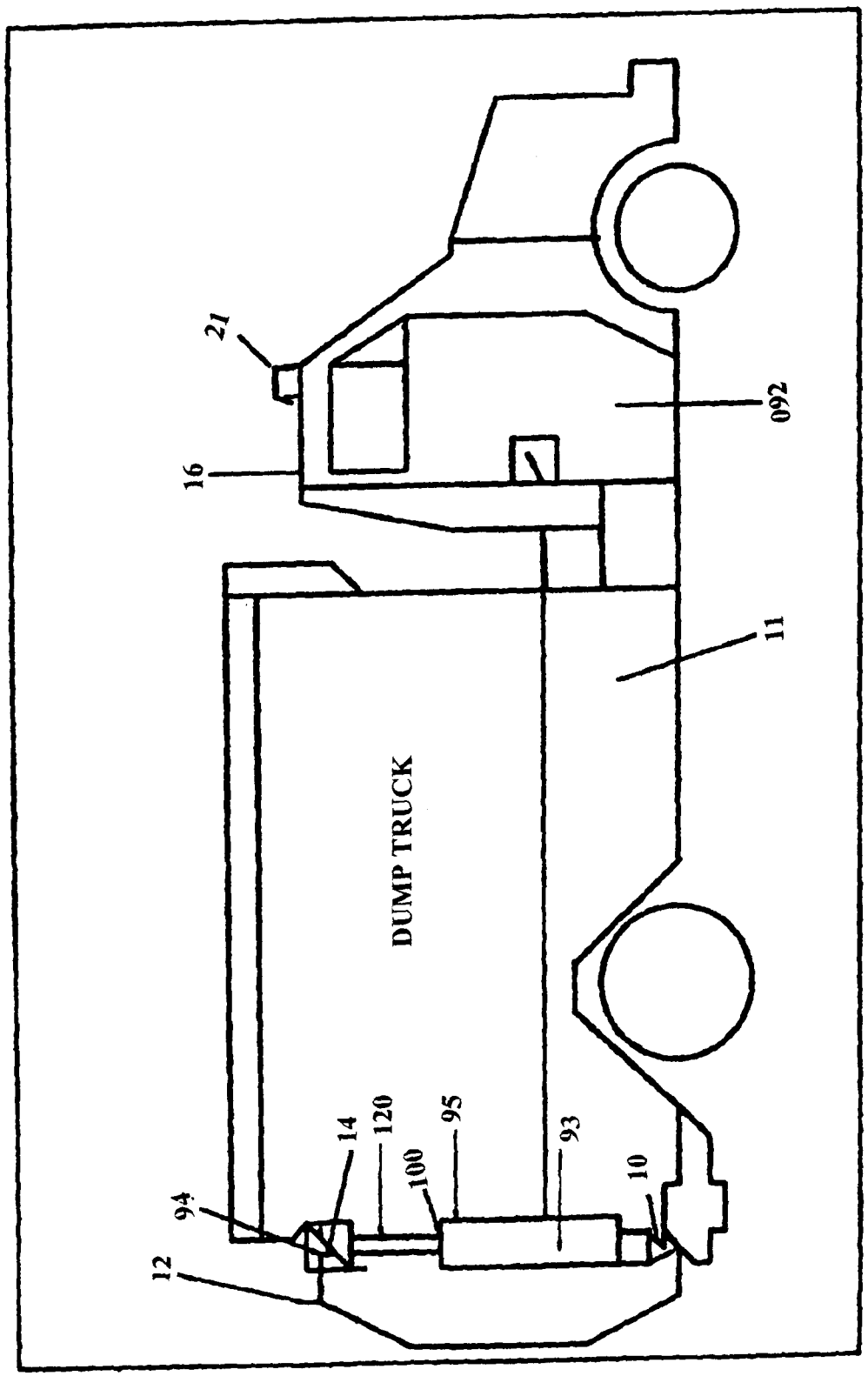
FIG. 15 is seen to represent a dump truck with the water proof speaker mounted at top, a tailgate and a tailgate cylinder mounted at rear of the truck body showing the lifting and operating conditions.

Referring to FIG. 15 is seen an exemplary embodiment of a heavy duty truck (092). Disclosed embodiments provide activation switch (94) configured for activating the voice over safety apparatus disposed with the truck (092). So that when any of the cylinders (100) is raised, the switch (94) is activated, sending electrical signal indicative of the behavior/operation of the tailgate mechanism (12), or applicable similar behavior/operation of other devices. The output terminal from the switch (94) relays to the data processor to energize the hydraulic control voice auditory chip, which receives a "1" when a cylinder is opened. The hydraulic control voice auditory chip comprises the human voice auditory chip configured to emit a human voice warning such as "Tailgate is opened, please lock the piston ends (120) of the cylinders (100)." Certain embodiments provide the heavy duty truck (092), being disposed with sensors (14) and (16), in association with the voice over safety apparatus. Some embodiments provide the voice over safety apparatus in communication with at least a waterproof speaker (21). Yet, other embodiments provide the heavy duty truck (092) further comprising at least one of: a pumping equipment (11), a vehicle with hydraulic operated devices (10). Disclosed embodiments provide the hydraulic operated devices comprises at least a housing (95), disposed with at least a mounting base portion (93).

Figure 16:
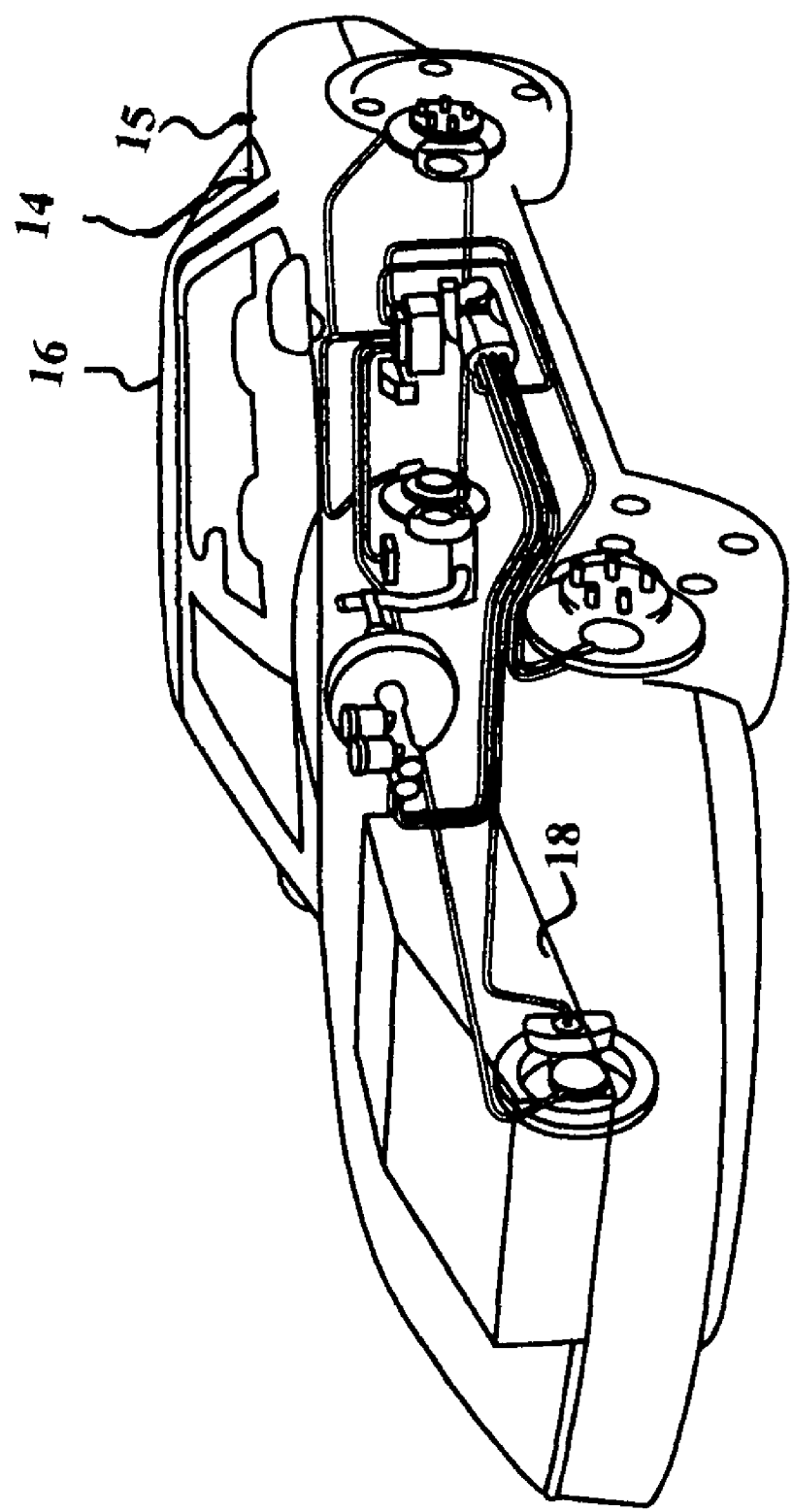
FIG. 16 is seen to represent a transportation bus (091) seen to emit voice auditory messages relating to the specific operation of the vehicle.
Figure 17:
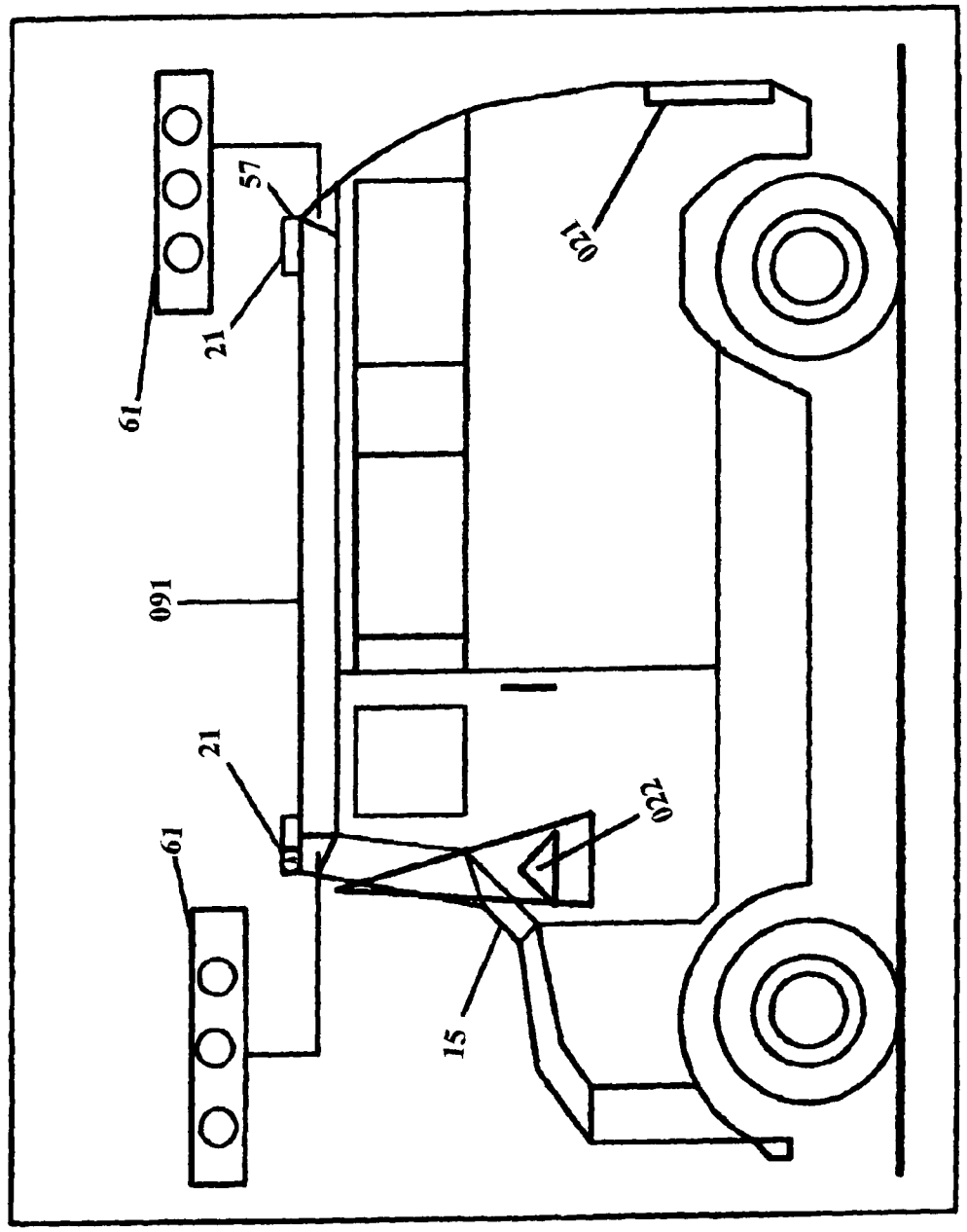
FIG. 17 is seen to represent a transportation vehicle having a waterproof speaker mounted at the tail light (021) and a waterproof speaker mounted at the mirror brackets (022).

Referring to FIG. 16 is seen an exemplary embodiment of a vehicle disposed with at least a sensor (14) operable for detecting vehicle proximity to objects. Disclosed embodiments further provide the vehicle being disposed with a transmission means in communication with at least a switch apparatus (15). Certain embodiments provide the vehicle with at least a camera (16) and a voice auditory safety apparatus (18). The voice auditory safety apparatus is in communication with at least one of: the camera, the switch, the sensor. Referring to FIG. 17 is seen an exemplary embodiment of a bus (091) disposed with at least a bracket (022) in association with at least a switch (15). The bracket may comprise a mirror bracket. The switch (15) is operable to activate at least a horn auditory (57) and at least a caution light (61). Disclosed embodiments further provide the switch (15) operable to activate the voice over safety apparatus. Certain embodiments provide the voice over safety apparatus in communication with at least a speaker means (21). Some embodiments provide the voice over safety apparatus disposed with a taillight assembly (021) and/or a mirror device.

Figure 18:
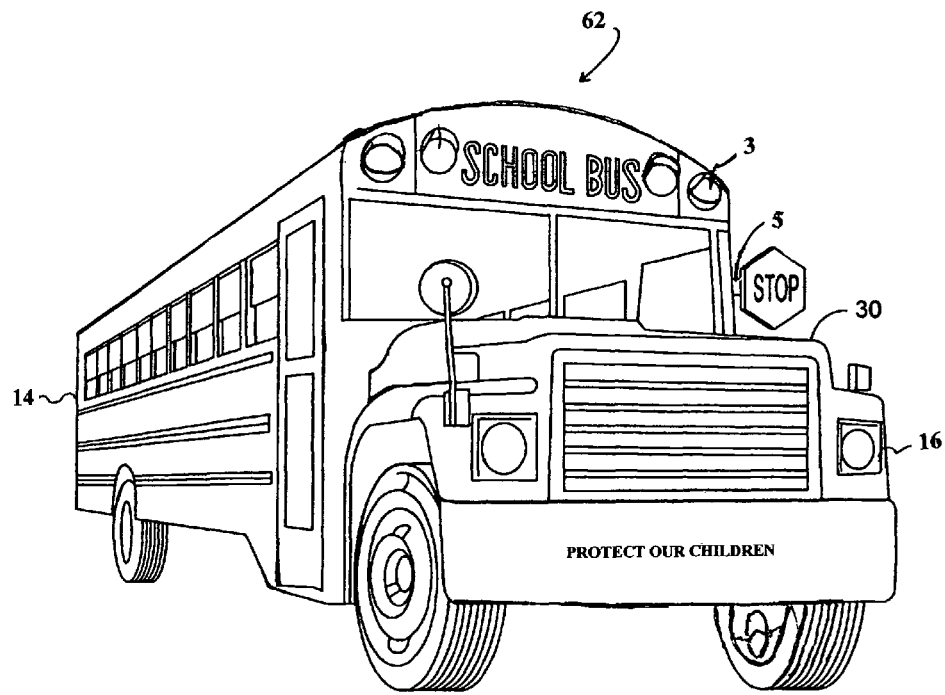
FIG. 18 is seen further exemplary embodiment of a school bus disposed with plurality voice auditory.
Figure 18:
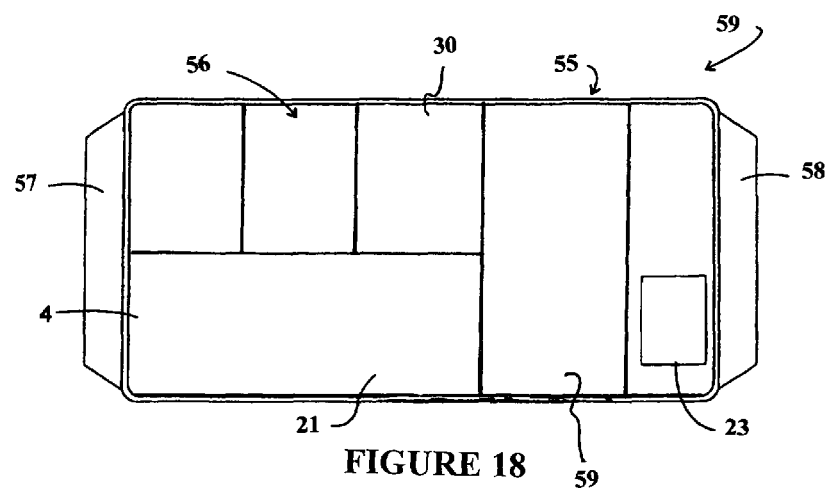

Referring to FIG. 18 is seen further exemplary embodiment of a school bus (62) disposed with at least a stop sign arm (5) and at least caution lights (3). Disclosed embodiments provide the school bus (62) further disposed with sensors (4), (14), and (16). At least sensor (4) is disposed on at least one of: a mirror structure, a lighting fixture, configured for detecting objects proximity to the front of the school bus. At least sensor (14) is configured to detect objects proximity to the rear of the school bus. At least sensor (16) is configured to the operator of the vehicle, images of objects proximate to the vehicle. Each sensor is associated with at least a voice auditory safety apparatus 55, operable to relay specific human voice messages. The voice auditory safety apparatus is operatively configured with amplifying means (30) and communicatively connected to at least a speaker means (21). Certain embodiments provide the voice auditory safety apparatus (55) comprising human voice auditory responsive to operations of at least one of: stop sign arm (5), vehicle backing up (56), vehicle stopping (57), loading/unloading (58), and door opening (59). The voice auditory may be configured at at least horn auditory.

Figure 19:
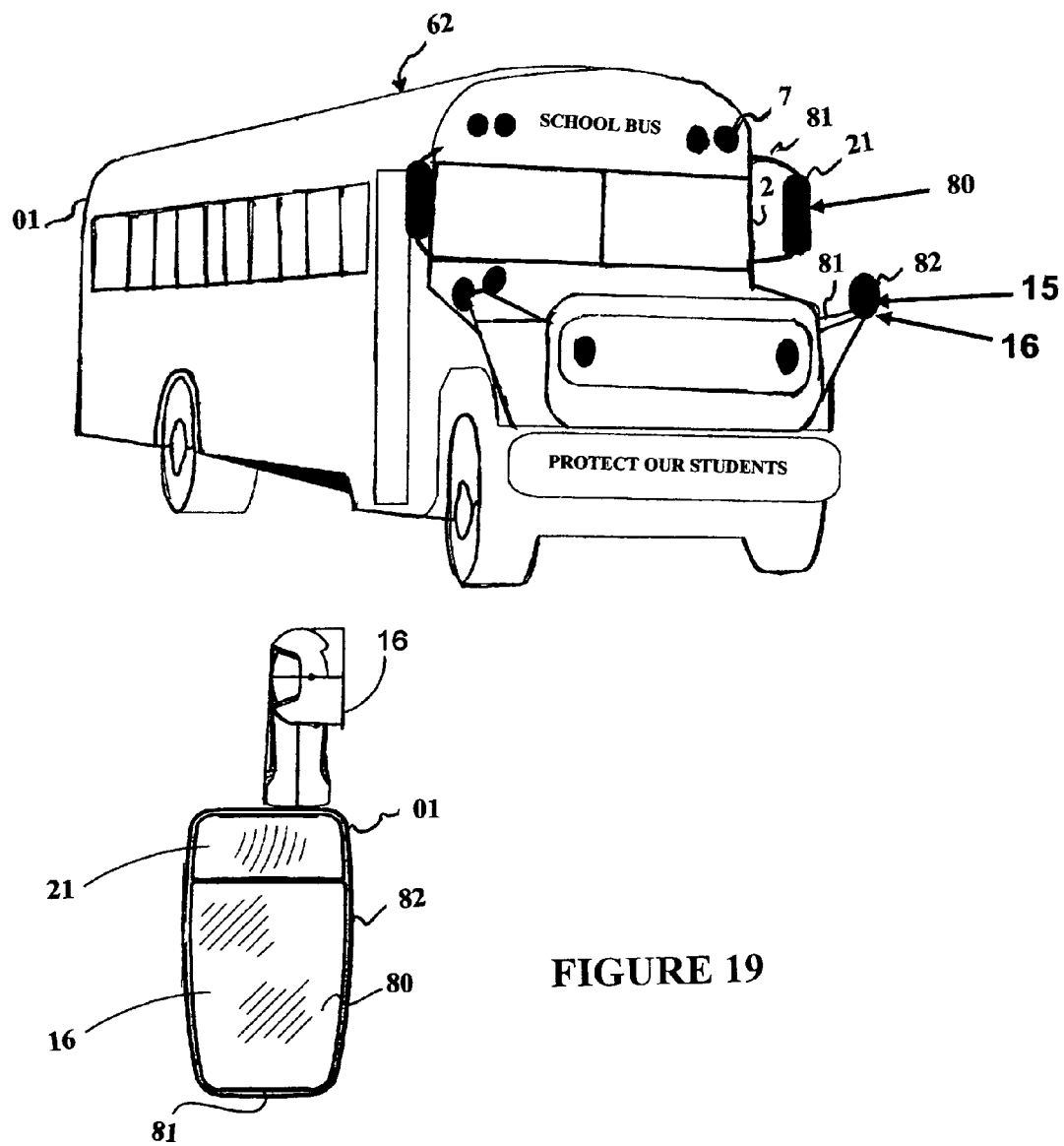
FIG. 19 is seen further exemplary embodiment of a school bus disposed with voice auditory on a mirror device.

Referring to FIG. 19 is seen further exemplary embodiment of a school bus (62), comprising a mirror device (80) secured on at least a mirror structure (81). At least a camera (01) is in communication with sensor (16), in association with voice auditory (82). The voice auditory (82) is in communication with a lighting device (7) and at least a speaker means (21). At least a switch (2) is operatively configured the voice auditory (82).

Figure 20:
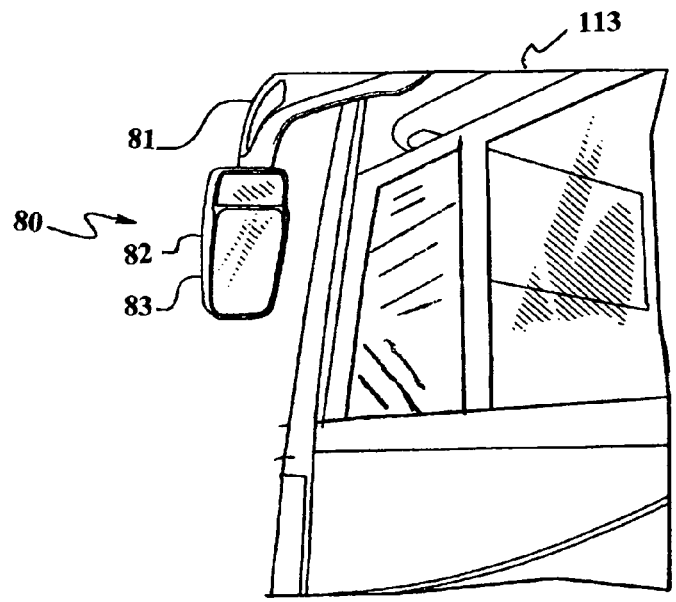
FIG. 20 is seen an exemplary embodiment of a commercial vehicle disposed with the voice auditory and a mirror configured with the voice auditory.
Figure 20:
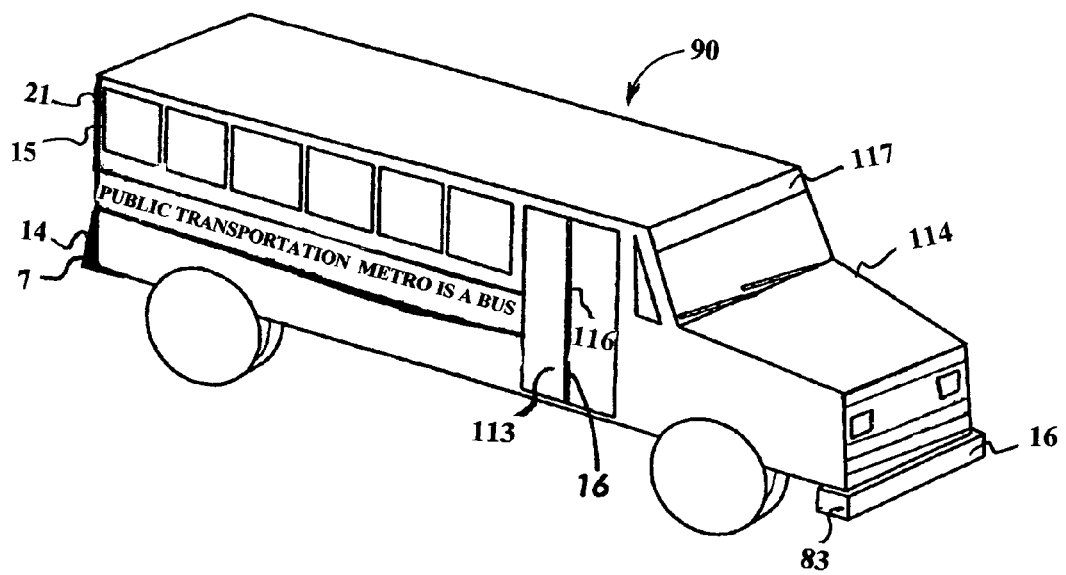

Referring to FIG. 20 is an exemplary embodiment of a commercial vehicle (90) disposed with the voice auditory safety apparatus (55). Disclosed embodiments provide the voice over safety apparatus (55) responsive to at least one of: door opening (113), vehicle backing up (115), vehicle stopping (114), vehicle component pre-operations (116), signal from detection devices (83), signal from sensors (14) and (16). Certain embodiments provide the voice auditory device (55) being disposed with at least at least one of: a speaker means (21), a mirror means (80), a lighting means (7), and at least a camera means (01). Some embodiments provide the voice auditory safety apparatus (55) comprising a human voice auditory response (82). Other embodiments provide the voice auditory safety apparatus being disposed with at least a mirror structure (81). Disclosed embodiments further provide the mirror structure (81) adjusting to at least detection when the vehicle (90) is backing up (115) and the camera (01) providing images of detections through the mirror (80), to the operator of the vehicle (90). Certain embodiments provide a sun visor apparatus (117) comprising a monitor operable to provide images of objects being detected, to the operator of the vehicle (90). In the disclosed embodiments, the commercial vehicle (90) when backing up, would broadcast the auditory phrase "Attention please, this vehicle is backing up," referring to the actual operation of the vehicle.

While certain aspects and embodiments of the disclosure have been described, these have been presented by way of example only, and are not intended to limit the scope of the disclosure. Indeed, the novelty of the apparatus described herein may be embodied in a variety of other forms without departing from the spirit thereof. The accompanying claims and their equivalents are intended to cover such forms or modifications as would fall within the scope and spirit of the disclosure. It is to be understood that the scope of the present invention is not limited to the above description. It is to be understood that the scope of the present invention is not limited to the sole embodiment described above, but encompasses any and all embodiments within the scope of the following claims.

What is claimed is:

1. Advanced voice over safety apparatus; comprising: at least a communication means configured for communicating in human voice auditory at least an operation of a vehicle; at least a signal supply apparatus responsive to the operation of said vehicle, in communication with said communication means; at least a housing assembly disposed with said communication means; said housing assembly is disposed with at least one of: an input source for receiving communications from said signal supply apparatus, at least an output source for outputting at least a response by said communication means; said signal supply apparatus further comprising at least one of: a switch means; a module; a sensor means; an electronic module; an actuator; each of the at least one said signal supply apparatus in association with at least a predefined vehicle component for defining the actual operation of said vehicle; and said output source further comprises at least a speaker apparatus;

wherein said input source further comprises at least an electrical power input to said communication means, and said output source further comprises at least a predetermined adjustment of at least a mirror, wherein said predetermined adjustment is enabled when the transmission is engaged in at least one mode to provide at least one of: a safe forward motion of the vehicle; a safe reverse motion of the vehicle; a detection of at least an object at the rear of the vehicle, a detection of at least an object proximately within the reach of the vehicle operation;

wherein said communications means further responsive to at least a state of operation of the vehicle;

wherein the state of operation further comprises at least a predetermined operation of the vehicle; comprising at least one of: a transmission being shifted to a reverse mode, a parking brake means operable in at least a releasing mode, a school bus stop sign arm operable in extending mode, a concrete mixer vehicle operable in at least funneling mode, vehicle tailgate operable in at least an opening mode, an air plane traveling in at least a reverse direction, a vehicle bed operable in at least an upward mode, at least a door opening, at least a door closing, at least the vehicle in angular motion, a school bus front arm being operable in extending mode, and a school bus front arm operable for sensing the presence of an object and activating at least a response;

wherein said communication means further comprises at least one of: a processor means comprising means for adjusting the operation of the vehicle minor when the vehicle transmission is activated, a processor means in association with at least a sensor means, a processor means configured for activating said response in human voice auditory when at least a rearward object detection is imminent;

wherein said communication means further configured for at least one of: outputting at least a human voice auditory communications to said speaker apparatus, wherein said human voice auditory, broadcasting at least a phrase comprising at least one of: "Attention Please, This Vehicle Is Backing up;" "Attention Please, This Car Is Backing up;" Attention Please, This Plane Is Backing up."

2. Advanced voice over safety apparatus of claim 1, wherein said communication means is an electronic communication device.

3. Advanced voice over safety apparatus of claim 1, wherein said signal supply apparatus further responsive to the operation of said predefined vehicle component.

4. Advanced voice over safety apparatus of claim 1, wherein said communication means further responsive to at least one of: an actual operation of the predefined vehicle component; an actual operation of the vehicle; broadcasting in human voice auditory an actual direction of the vehicle motion to at least a passer-by; wherein said actual operation further comprises at least a vehicle transmission apparatus being engaged in at least a reverse mode.

5. Advanced voice over safety apparatus of claim 1, wherein said signal supply apparatus further responsive to at least a pre-mechanical operation of said predefined vehicle component.

6. Advanced voice over safety apparatus of claim 1, wherein said communication means is disposed with the housing assembly, wherein the housing assembly further comprises at least one of: a mounting base to be affixed internal to said vehicle; a mounting base to be affixed external to said vehicle.

7. Advanced voice over safety apparatus of claim 1, wherein said signal supply apparatus further comprises means for communicating at least a pre-mechanical operation of the vehicle, and wherein said pre-mechanical operation further comprising at least one of: door operation, window operation, roof operation, seatbelt operation, seat operation, control means operation, vehicle transmission in reverse mode, further comprises the process of engaging at least an apparatus to activate said predefined vehicle component.

8. Advanced voice over safety apparatus of claim 1, wherein said predefined vehicle component further comprises means for engaging the vehicle transmission in reverse direction, and wherein said output source further comprises means for broadcasting said vehicle operation in human voice auditory.

9. Advanced voice over safety apparatus of claim 1, wherein said output source further comprises means for broadcasting said human voice auditory responsive to at least one of: a vehicle window operation; a door operation; a transmission operation.

10. Advanced voice over safety apparatus of claim 1, wherein said communication means further comprises at least a sensor means in communication with at least a human voice auditory response apparatus.

11. Advanced voice over safety apparatus of claim 1, wherein said communication means further comprises at least a chip being disposed with at least a human voice auditory response apparatus in communication with said speaker apparatus.

12. Advanced voice over safety apparatus of claim 1, wherein said sensor means further comprises at least a proximity sensor in communication with said voice auditory response apparatus.

13. Advanced voice over safety apparatus of claim 12, wherein said proximity sensor further comprises a detection means configured for detecting objects proximity to the vehicle.

14. Advanced voice over safety apparatus of claim 1, wherein said sensor means further operatively configured for detecting objects proximity to said vehicle when said vehicle transmission is engaged in at least a motion mode.

15. Advanced voice over safety apparatus of claim 1, wherein said communication means further responsive to at least one of: the operation of said predefined vehicle component, a vehicular component failure code signals.

16. Advanced voice over safety apparatus of claim 1, wherein said housing assembly further comprises at least a lighting means.

17. Advanced voice over safety apparatus of claim 1, wherein said housing assembly further comprises at least one of: a mirror structure; a sensor apparatus.

18. Advanced voice over safety apparatus of claim 1, wherein said communication means is further disposed within at least one of: internal to the structural means of the vehicle, and external to the structural means of the vehicle.

19. Advanced voice over safety apparatus of claim 1, wherein said communication means further comprising at least an interactive interface apparatus.

20. Advanced voice over safety apparatus of claim 19, wherein said interactive interface apparatus further comprising at least a prescribed human voice auditory response for selectively broadcasting at least a predefined message.

* * * * *